Oct. 2, 1956     A. B. LANDRY     2,765,031
STORM AND SCREEN DOORS OR WINDOWS
Filed Aug. 31, 1954     2 Sheets-Sheet 1

INVENTOR.
ARTHUR B. LANDRY
BY
Barnes, Kisselle, Laughlin & Raisch
ATTORNEYS.

Oct. 2, 1956 A. B. LANDRY 2,765,031
STORM AND SCREEN DOORS OR WINDOWS
Filed Aug. 31, 1954 2 Sheets-Sheet 2

INVENTOR.
ARTHUR B. LANDRY
BY
Barnes, Kisselle, Laughlin & Raisch
ATTORNEYS.

United States Patent Office 2,765,031
Patented Oct. 2, 1956

2,765,031

STORM AND SCREEN DOORS OR WINDOWS

Arthur B. Landry, Royal Oak, Mich.

Application August 31, 1954, Serial No. 453,278

3 Claims. (Cl. 160—128)

This invention relates to combination storm and screen doors or windows. It is the object of the invention to provide a door or window with interchangeable panels which may be screen panels, glass panels or metal panels.

The rails for the panels are box cross section and are recessed to take either the panel frame that can hold a rubber sealing strip and also can take a plain metal panel without a sealing strip.

The rails are provided with overlapping flanges which are recessed to take a soft rubber sealing strip which can abut against the window opening frame. This allows the overlapping flange to be somewhat spaced from a window opening frame and consequently it provides a large amount of tolerance so that the door or window frame can easily fit in openings that can vary considerably in dimensions without affecting the applicability of the swinging frame to the opening.

Referring to the drawings.

Figure 4:
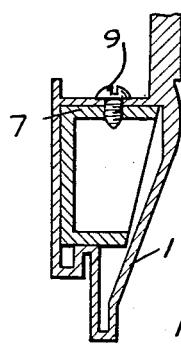
Fig. 4 is a cross section taken on the line 4—4 of Fig. 3.
Figure 3:
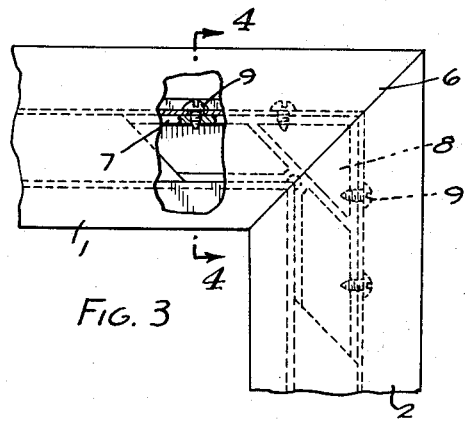
Fig. 3 is a fragmentary detail of the door or window frame showing the corner construction.
Figure 5:
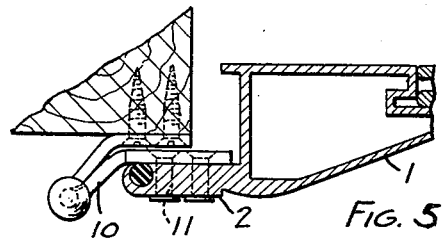
Fig. 5 is a cross section taken on the line 5—5 of Fig. 1.
Figure 6:
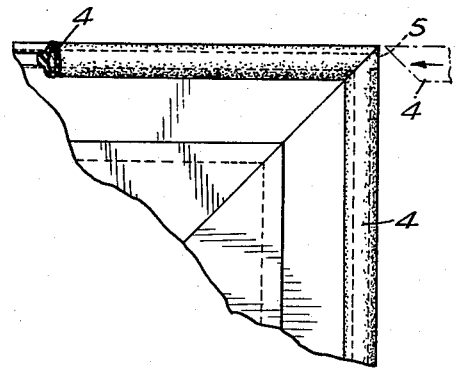
Fig. 6 is a fragmentary detail of the outside corner of the swinging frame showing how the sealing strip can be slipped in place.
Figure 7:
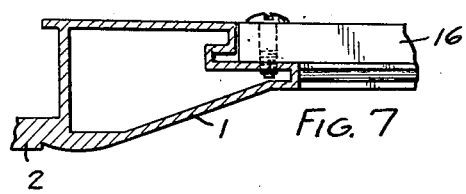
Fig. 7 is a cross section on the line 7—7 of Fig. 1.

The frame 1 is of hollow box-like cross section with the overlap flange 2 recessed at 3 to take the rubber sealing strip 4 which can be slid in place as shown in Fig. 6 through the opening 5. The two horizontal and two vertical rails have a mitered joint at 6 as shown in Fig. 3 and are secured in place by means of the casting 7 which is shown in cross section in Fig. 4 and in dotted lines in Fig. 3. This corner piece is an L-like channel member with the oblique crossbar or brace 8. It is inserted in the meeting ends of the rails at the mitered joint and then screws 9 are passed through perforations in the outside wall of the rail and screwed into threaded openings in the corner piece as shown in Figs. 4 and 5.

The hinges 10 are secured to the underside of the overlap rail by means of screws 11 as shown in Fig. 5.

Figures 1, 2:
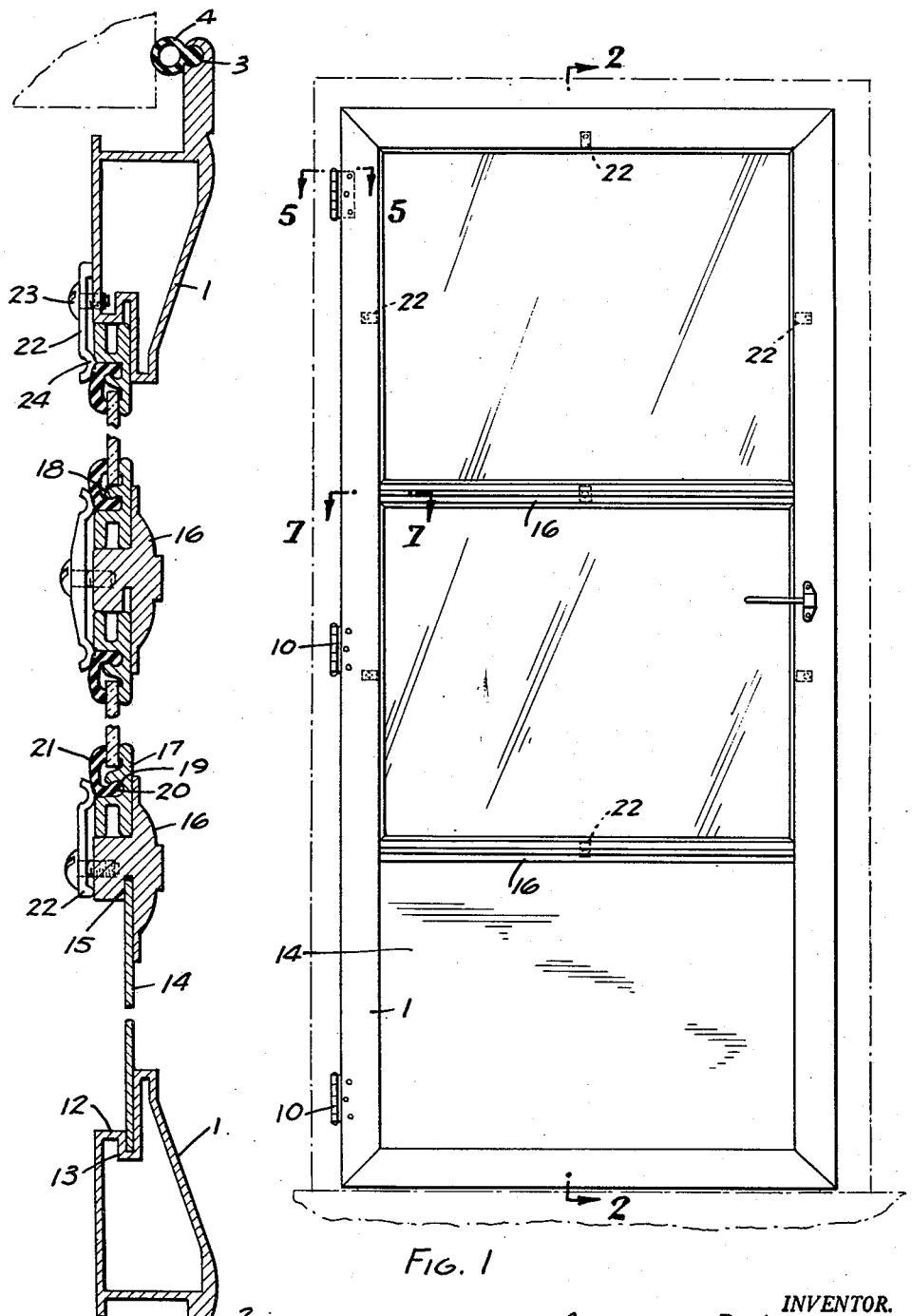
Fig. 1 is a front elevation of a swinging door frame adapted to take a variety of panels.
Fig. 2 is a cross section on the line 2—2 of Fig. 1.

On the inside of the rails there is formed a double recess 12, that is, a major angular recess with an offset recess 13. This offset recess 13 takes the metal panel 14, which, at the sides and bottom, fits into these offset recesses of the bottom and side rails. At the top the metal panel fits into the narrow recess 15 of the solid metal meeting rail 16. The major recess of the rails can seat the metal bars 17 of the convertible glass or screen panel. These bars are made of extruded metal and are preferably of reversed h cross section with the upper stem of the h provided with a hooked-over portion 18 that arcs downwardly to provide a bead with an arc-like recess 19. This bead seats the corresponding head 20 on the rubber channel-like sealing strip 21 which is of C section. When this C section strip has been hooked into the underside of the bead and against the glass panel as shown in cross section of Fig. 2, the clamps 22 can be put in place and anchored by screws 23. These clamps have the contact bead 24 which presses against the outside of the seat strips and not only presses the seat strips into the bead anchorage but also up against the glass.

Figure 8:
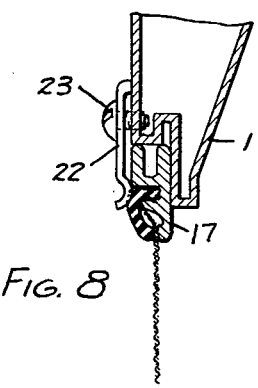
Fig. 8 is a section through the upper rail of the swinging frame taken at the same location as section 2—2 but showing a screen instead of a glass panel.
Figure 9:
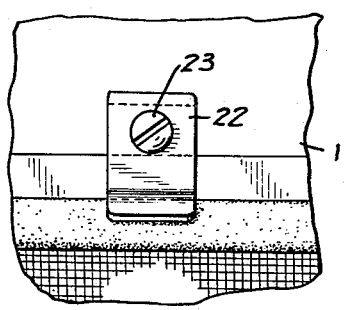
Fig. 9 is a front fragmentary elevation of the upper rail with the screen secured in place.

Refer to Fig. 8. This shows how these clamps and the C section sealing strip hold the screen when the panel frame takes a screen in place of a glass panel. Here the edge of the screen is looped over the vertical stem of the h section extruded rail and is passed into the recess formed by the arc-like bead. Then the rubber C section strip is pressed against the edge portion of the screen and the clamps 22 are anchored in place by the screws 23.

The usefulness of this special rail and clamp construction will now be apparent. This permits the door or swinging frame to be used in summer and winter interchangeably as a screen or storm door or window with only one set of panels. The common type interchangeable storm doors and screens require separate interchangeable panel frames. With my arrangement one set of panel frames can be used and only the glass and the screens interchanged in the panel. I am not claiming this new rail and sealing strip in this application. This is the subject matter of the copending application Serial No. 453,212, filed August 31, 1954.

The large hollow box-like rails and stiles are preferably made of extruded aluminum or any other rust-proof metal. The same is true with the h section panel rails and also the center meeting rail.

What I claim is:

1. A combined storm and screen door or window having in combination an outer frame made up of one or more meeting rails and upper and lower rails and vertical stiles, each of which has a box-like section and, save the meeting rail or rails, having wide overlap flanges to fit over the outside of window frames of varying dimensions, each of which rails has a double recess on the inside of the box-like section, one a major recess, the other a narrow recess opening into the major recess, interchangeable screen and glass panels, each having a frame which can fit in the major recesses with sealing strips for holding and sealing the screen or glass panel in the outer frame, locking devices secured on the box-like frame for removably holding a panel in the adjoining major recesses, and a sheet metal panel fitted into the narrow recesses in some of the rails and held therein when the storm window or door is assembled.

2. The combination claimed in claim 1 with the underside of the overlap flange provided with an opening and a contact weather strip fitting into the opening to contact the frame of the window opening and not only seal the storm and screen frame in place but also to provide tolerance in a variety of window dimensions.

3. The combination claimed in claim 1 in which the rails are made of extruded aluminum.

References Cited in the file of this patent

UNITED STATES PATENTS

| | | |
|---|---|---|
| 2,169,172 | Trautvetter | Aug. 8, 1939 |
| 2,197,150 | Lambert | Apr. 16, 1940 |
| 2,506,978 | Unterberger | May 9, 1950 |
| 2,647,571 | Landry et al. | Aug. 4, 1953 |